United States Patent
Lee et al.

(10) Patent No.: US 11,527,244 B2
(45) Date of Patent: Dec. 13, 2022

(54) DIALOGUE PROCESSING APPARATUS, A VEHICLE INCLUDING THE SAME, AND A DIALOGUE PROCESSING METHOD

(71) Applicants: HYUNDAI MOTOR COMPANY, Seoul (KR); KIA MOTORS CORPORATION, Seoul (KR)

(72) Inventors: Jeong-Eom Lee, Yongin-si (KR); Youngmin Park, Gunpo-si (KR); Seona Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 296 days.

(21) Appl. No.: 16/788,986

(22) Filed: Feb. 12, 2020

(65) Prior Publication Data
US 2021/0043202 A1    Feb. 11, 2021

(30) Foreign Application Priority Data
Aug. 6, 2019 (KR) .......... 10-2019-0095495

(51) Int. Cl.
*G10L 15/22* (2006.01)
*G10L 15/18* (2013.01)
(Continued)

(52) U.S. Cl.
CPC .......... *G10L 15/22* (2013.01); *G10L 15/05* (2013.01); *G10L 15/1815* (2013.01); *G10L 15/28* (2013.01); *G10L 2015/223* (2013.01)

(58) Field of Classification Search
CPC ... G10L 15/22; G10L 2015/223; G10L 15/30; G10L 15/26; G10L 15/32; G10L 15/063; G10L 15/1815; G10L 2015/0635; G10L 2015/225; G10L 15/01; G10L 15/08; G10L 15/16; G10L 15/183; G10L 2015/088; G10L 2015/221; G10L 2015/228; G06F 40/134; G06F 40/169; G06F 40/211; G06F 40/279; G06F 40/30; G06F 40/35; G06F 40/56; H04N 21/252; H04N 21/25883;
(Continued)

(56) References Cited

U.S. PATENT DOCUMENTS 8,548,806 B2 * 10/2013 Nagashima ............. G10L 15/32
704/238
10,706,853 B2 * 7/2020 Baba ...................... G10L 17/00
(Continued)

*Primary Examiner* — Vijay B Chawan
(74) *Attorney, Agent, or Firm* — Lempia Summerfield Katz LLC

(57) ABSTRACT

A dialogue processing apparatus includes: a speech input device configured to receive a speech signal of a user; a first buffer configured to store the received speech signal therein; an output device; and a controller. The controller is configured to: detect an utterance end time point on the basis of the stored speech signal; generate a second speech recognition result corresponding to a speech signal after the utterance end time point on the basis of whether an intention of the user is to be identified from a first speech recognition result corresponding to a speech signal before the utterance end time point; and control the output device to output a response corresponding to the intention of the user determined on the basis of at least one of the first speech recognition result or the second speech recognition result.

20 Claims, 6 Drawing Sheets

(51) Int. Cl.
*G10L 15/28* (2013.01)
*G10L 15/05* (2013.01)

(58) Field of Classification Search
CPC ........... H04N 21/2668; H04N 21/4532; H04N 21/6582; H04N 5/642
USPC ....... 704/235, 238, 246, 251, 231, 243, 252, 704/256, 257, 9
See application file for complete search history.

(56) References Cited

U.S. PATENT DOCUMENTS

| | | | |
|---|---|---|---|
| 2006/0143007 A1* | 6/2006 | Koh | G10L 15/22 |
| | | | 704/E15.04 |
| 2017/0201779 A1* | 7/2017 | Publicover | G06F 16/2358 |
| 2018/0199123 A1* | 7/2018 | Rao | G06F 1/1656 |
| 2018/0277119 A1* | 9/2018 | Baba | G10L 17/00 |
| 2018/0342233 A1* | 11/2018 | Li | G10L 15/22 |
| 2019/0371329 A1* | 12/2019 | D'Souza | G10L 15/063 |
| 2019/0392836 A1* | 12/2019 | Kang | G06F 40/56 |
| 2020/0349943 A1* | 11/2020 | Elangovan | G06F 16/156 |
| 2020/0365154 A1* | 11/2020 | Sindhwani | G06Q 30/0635 |

* cited by examiner

DIALOGUE PROCESSING APPARATUS, A VEHICLE INCLUDING THE SAME, AND A DIALOGUE PROCESSING METHOD

CROSS-REFERENCE TO RELATED APPLICATION

This application is based on and claims priority under 35 U.S.C. § 119 to Korean Patent Application No. 10-2019-0095495, filed on Aug. 6, 2019 in the Korean Intellectual Property Office, the disclosure of which is incorporated herein by reference.

BACKGROUND

1. Field

The disclosure relates to a dialogue processing apparatus for identifying a user's intention through a dialogue with a user and providing information or services desired by the user, a vehicle including the same, and a dialogue processing method thereof.

2. Description of the Related Art

A dialogue processing apparatus is an apparatus for performing a dialogue with a user. The dialogue processing apparatus operates to recognize a user's speech, identify a user's intention through a result of recognizing the speech, and output a response for providing the user with desired information or service.

When recognizing a user's speech, there is a need to determine a section in which the user actually speaks an utterance, and to this end, it is difficult to detect a point at which the user finishes the utterance. Such a detection is referred to as an end point detection (EPD).

The conventional dialogue processing apparatus recognizes that a user has finished an utterance when a silent section longer than or equal to a predetermined time is detected. The conventional dialogue processing apparatus generates a speech recognition result based on speech data obtained to the point at which the utterance is finished. In this case, when the user does not speak for a predetermined time without having an intention to finish the utterance, a next speech input by the user is not considered in generating the speech recognition result. Thus, a response mismatching the user's intention is output.

SUMMARY

Therefore, it is an object of the present disclosure to provide a dialogue processing apparatus capable of receiving a speech signal of a user and outputting a response corresponding to the speech signal of the user, a vehicle including the same, and a dialogue processing method thereof.

Additional aspects of the disclosure are set forth in part in the description which follows and, in part, should be obvious from the description, or may be learned by practice of the disclosure.

Therefore, it is an aspect of the present disclosure to provide a dialogue processing apparatus. The dialogue processing apparatus includes: a speech input device configured to receive a speech signal of a user; a first buffer configured to store the received speech signal therein; an output device; and a controller. The controller is configured to: detect an utterance end time point on the basis of the stored speech signal; generate a second speech recognition result corresponding to a speech signal after the utterance end time point on the basis of whether an intention of the user is to be identified from a first speech recognition result corresponding to a speech signal before the utterance end time point; and control the output device to output a response corresponding to the intention of the user determined on the basis of at least one of the first speech recognition result or the second speech recognition result.

The second speech recognition result corresponding to the speech signal after the utterance end time point may be generated when the intention of the user is not identifiable from the first speech recognition result.

The dialogue processing apparatus may further include a second buffer. The controller may store the first speech recognition result in the second buffer when the intention of the user is not identifiable from the first speech recognition result.

The controller may generate the second speech recognition result on the basis of a number of times of the speech recognition when the intention of the user is not identifiable from the first speech recognition result.

The controller may generate the second speech recognition result on the basis of the speech signal after the utterance end time point when the number of times of the speech recognition is less than a predetermined reference value.

The controller may delete data stored in the first buffer when the number of times of the speech recognition is greater than or equal to a predetermined reference value, and generates a response corresponding to a case in which the intention of the user is not identifiable.

The controller may set the number of times of the speech recognition to an initial value when a response corresponding to the speech signal of the user is output.

When the second speech recognition result is generated, the controller may determine an intention candidate group for determining the intention of the user on the basis of at least one of the first speech recognition result or the second speech recognition result. The controller may further determine one selected from the determined intention candidate group to be the intention of the user.

The controller may determine an accuracy on the intention candidate group and determine an intention candidate in the intention candidate group that has a highest accuracy to be the intention of the user.

When the utterance end time point is detected, the controller may be configured to delete data stored in the first buffer and store a speech signal input after the utterance end time point in the first buffer.

When the intention of the user is identifiable from the first speech recognition result, the controller may delete data stored in the first buffer.

It is another aspect of the present disclosure to provide a vehicle including: a speech input device configured to receive a speech signal of a user; a first buffer configured to store the received speech signal therein; an output device; and a controller. The controller is configured to: detect an utterance end time point on the basis of the stored speech signal; generate a second speech recognition result corresponding to a speech signal after the utterance end time point on the basis of whether an intention of the user is to be identified from a first speech recognition result corresponding to a speech signal before the utterance end time point; and control the output device to output a response corresponding to the intention of the user determined on the basis of at least one of the first speech recognition result or the second speech recognition result.

The controller may generate the second speech recognition result corresponding to the speech signal after the utterance end time point when the intention of the user is not identifiable from the first speech recognition result.

When the second speech recognition result is generated, the controller may determine an intention candidate group for determining the intention of the user on the basis of at least one of the first speech recognition result or the second speech recognition result. The controller may further determine one selected from the determined intention candidate group to be the intention of the user.

It is another aspect of the present disclosure to provide a dialogue processing method. The processing method includes: receiving a speech signal of a user; storing the received speech signal therein; detecting an utterance end time point on the basis of the stored speech signal; generating a second speech recognition result corresponding to a speech signal after the utterance end time point on the basis of whether an intention of the user is to be identified from a first speech recognition result corresponding to a speech signal before the utterance end time point; and outputting a response corresponding to the intention of the user determined on the basis of at least one of the first speech recognition result or the second speech recognition result.

The generating of a second speech recognition result corresponding to a speech signal after the utterance end time point may include generating the second speech recognition result corresponding to the speech signal after the utterance end time point is generated when the intention of the user is not identifiable from the first speech recognition result.

The generating of a second speech recognition result corresponding to a speech signal after the utterance end time point may include storing the first speech recognition result in the second buffer when the intention of the user is not identifiable from the first speech recognition result.

The generating of a second speech recognition result corresponding to a speech signal after the utterance end time point may include generating the second speech recognition result on the basis of a number of times of the speech recognition when the intention of the user is not identifiable from the first speech recognition result.

The generating of a second speech recognition result corresponding to a speech signal after the utterance end time point may include generating the second speech recognition result on the basis of the speech signal after the utterance end time point when the number of times of the speech recognition is less than a predetermined reference value.

The dialogue processing method may further include when the second speech recognition result is generated, determining an intention candidate group for determining the intention of the user on the basis of at least one of the first speech recognition result or the second speech recognition result, and determining one selected from the determined intention candidate group to be the intention of the user.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
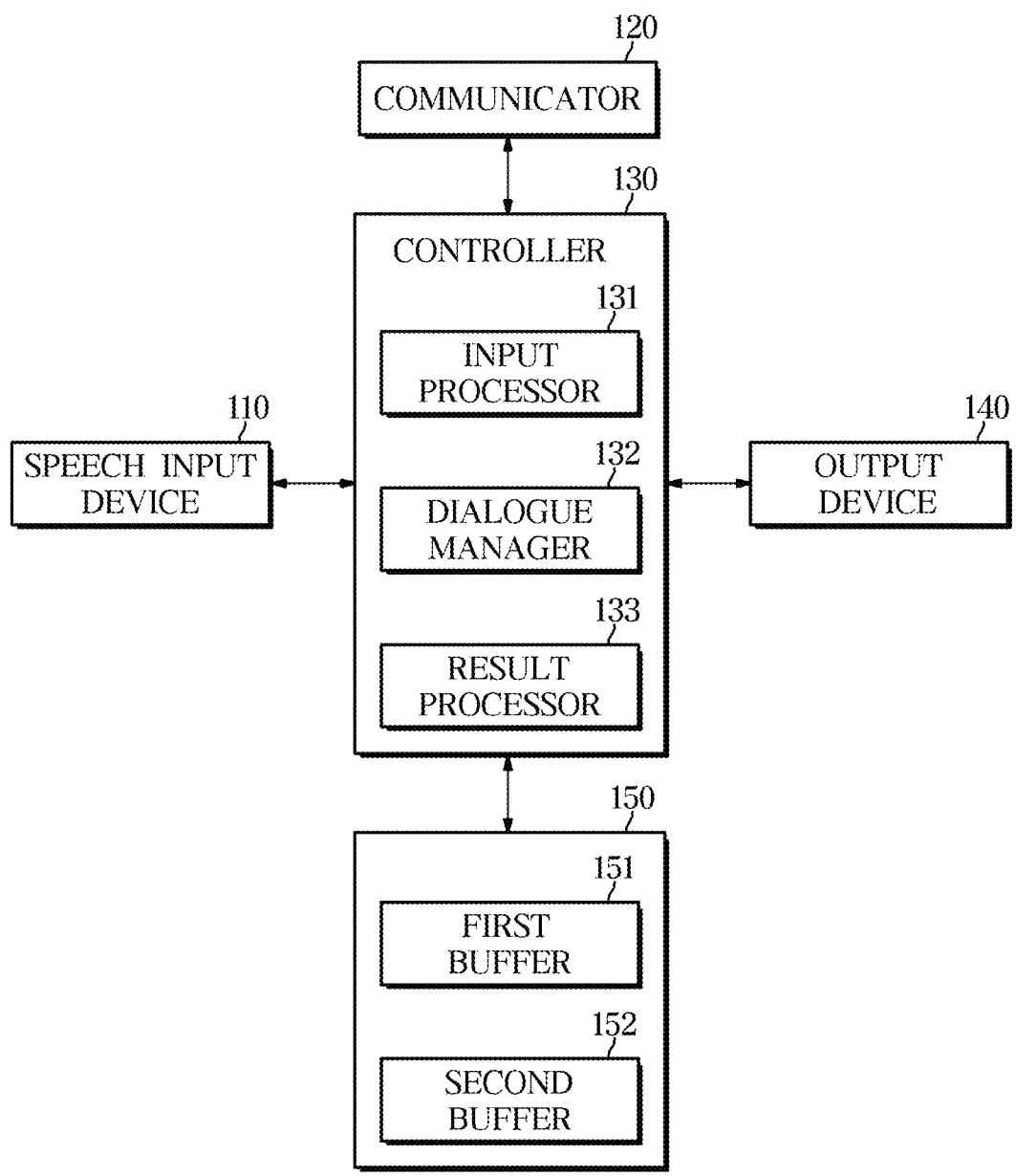
FIG. 1 is a control block diagram illustrating a dialogue processing apparatus according to an embodiment.

Like numerals refer to like elements throughout the specification. Not all elements of the embodiments of the present disclosure are described. Description of what are commonly known in the art or what overlaps with each other in the embodiments has been omitted. The terms as used throughout the specification, such as part", module", member", ~block", etc., may be implemented in software and/or hardware, and a plurality of ~parts", modules", members", or blocks" may be implemented in a single element, or a single part", module", member", or block" may include a plurality of elements.

It should be further understood that the term "connect" or its derivatives refer both to direct and indirect connection. The indirect connection includes a connection over a wireless communication network.

It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure are described below with reference to the accompanying drawings.

FIG. 1 is a control block diagram illustrating a dialogue processing apparatus according to an embodiment.

Referring to FIG. 1, a dialogue processing apparatus 100 according to an embodiment includes a speech input device 110, a communicator 120, a controller 130, an output device 140, and a storage 150.

The speech input device 110 may receive a command of a user in the form of a speech. In other words, the speech input device 110 may receive a speech signal of the user. To this end, the speech input device 110 may include a microphone that receives sound and converts the sound into an electrical signal.

The storage 150 may store various types of data used directly or indirectly by the dialogue processing apparatus 100 to output a response corresponding to a speech of the user.

In addition, the storage 150 may include a first buffer 151 and a second buffer 152. The first buffer 151 may store the input speech signal, and the second buffer 152 may store a result of a speech recognition.

The storage 150 may be implemented using at least one of a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 150 is not limited thereto. The storage 150 may be a memory implemented as a chip separated from a processor, which is described below in connection with the controller 130, or implemented as a single chip integrated with a processor.

The controller 130 includes: an input processor 131 configured to recognize an input speech signal to generate a speech recognition result; a dialogue manager 132 configured to identify an intention of the user on the basis of the speech recognition result and determine an action corresponding to the intention of the user; and a result processor 133 configured to generate a dialogue response for performing the determined action.

The input processor 131 may recognize an input speech signal of the user and may convert the speech signal of the user into a text-type utterance. The input processor 131 may apply a natural language understanding algorithm to the utterance text to identify the intention of the user.

At least one of the utterance text or the user's intention may be output by the input processor 131 as a speech recognition result. The input processor 131 may transmit the speech recognition result to the dialogue manager 132.

To this end, the input processor 131 may include a speech recognition module and may be implemented using a processor (not shown) that performs an operation for processing the input speech.

The speech processing operation of the input processor 131 may be performed when a speech is input or may be performed when a speech is input and a specific condition is satisfied.

In detail, the input processor 131 may perform the above-described speech processing operation when a predetermined call word is input or when a speech recognition start command is received from the user.

In addition, the input processor 131 may generate a speech recognition result corresponding to a speech signal input for a specific section. In detail, the input processor 131 may generate a speech recognition result corresponding to a speech signal from an utterance start time point to an utterance end time point.

To this end, the input processor 131 may detect an utterance start time point or an utterance end time point on the basis of an input speech signal. The input processor 131 may determine a time point at which a predetermined call word is input or at which a speech recognition start command is received from a user as an utterance start time point. In this case, the user may input the speech recognition start command by uttering a predetermined call word or through a separate button, and the input processor 131 may recognize the speech of the user from the utterance start time point.

In addition, the input processor 131 may identify that the utterance of the user is terminated when a silent section longer than or equal to a predetermined time exists in the input speech signal. In this case, the input processor 131 may determine a time point at which a predetermined time has elapsed from a start time of the silent section as the utterance end time point.

On the other hand, when the user stops the utterance for a short time without intending to terminate the utterance, the silent section during the stop of the utterance for a short time causes the user's utterance to be misrecognized as having been terminated. Therefore, the speech signal of the user after the stop of the utterance may not be considered in generating a speech recognition result. In this case, when it is difficult to recognize the user's intention only on the basis of the speech signal before the user stops the utterance, the user's intention cannot be accurately identified. Therefore, it is difficult to output a dialogue response suitable for the user's situation.

To this end, the input processor 131 may determine whether to recognize a speech signal after the utterance end time point end on the basis of whether the user's intention corresponding to the speech signal before the utterance end time point is identifiable. Details thereof are described below.

On the other hand, the input processor 131 may perform an operation of removing noise of the input speech signal and recognizing a user corresponding to the input speech signal, in addition to the above-described operation.

The dialogue manager 132 may determine the user's intention on the basis of the speech recognition result received from the input processor 131, and determine an action corresponding to the user's intention.

The result processor 133 may provide a specific service or output a system utterance for continuing a dialogue according to the output result of the dialogue manager 132. The result processor 133 may generate a dialogue response and a command required for performing the received action and may output the command. The dialogue response may be output as text, image, or audio. When the command is output, services corresponding to the output command, such as vehicle control and external content provision, may be performed.

The control unit 130 may include a memory (not shown) for storing data regarding an algorithm for controlling the operations of the components of the dialogue processing apparatus 100 or a program that represents the algorithm The control unit 130 may also include a processor (not shown) that performs the above described operations using the data stored in the memory. In this case, the memory and the processor may be implemented as separate chips. Alternatively, the memory and the processor may be implemented as a single chip.

Alternatively, the input processor 131, the dialogue manager 132, and the result processor 133 may be integrated into one processor or may be implemented as separate processors.

The output device 140 may output a response generated by the controller 130 visually or audibly. To this end, the output device 140 may include a display (not shown) or a speaker (not shown). The display (not shown) and the speaker (not shown) may not only output a response to the user's utterances, a query to the user, or information to be provided to the user, but also output a confirmation of the user's intention and responses to an utterance of the person at the other end of the line in a visual or audible manner.

The communicator 120 may communicate with an external device such as a server. To this end, the communicator 120 may include one or more components that enable communication with an external device, for example, at least one of: a short-range communication module, such as a Bluetooth module, an infrared communication module, and a radio frequency identification (RFID) communication module; a wired communication module, such as a controller area network (CAN) communication module and a local area network (LAN) module; and a wireless communication module, such as a Wi-Fi module and a wireless broadband module.

When the communicator 120 includes a wireless communication module, the wireless communication module may include a wireless communication interface including an antenna and a transmitter for transmitting signals. In addition, the wireless communication module may further include a signal converting module for converting a digital control signal output from the dialogue processing apparatus 100 through the wireless communication interface into an analog type wireless signal under the control of the dialogue processing apparatus 100.

The wireless communication module may include a wireless communication interface including an antenna and a receiver for receiving signals. In addition, the wireless communication module may further include a signal converting module for demodulating an analog type wireless signal received through the wireless communication interface into a digital control signal.

At least one component may be added or omitted to correspond to the performances of the components of the dialogue processing apparatus 100 shown in FIG. 1. In addition, the mutual positions of the components may be changed to correspond to the performance or structure of the system.

Each of the components shown in FIG. 1 may refer to a software component and/or a hardware component, such as a Field Programmable Gate Array (FPGA) and an Application Specific Integrated Circuit (ASIC).

All or some components of the dialogue processing apparatus 100 illustrated in FIG. 1 may be included in the vehicle, may recognize a speech of a user including a driver and a passenger of the vehicle and may provide a suitable response.

Figure 2:
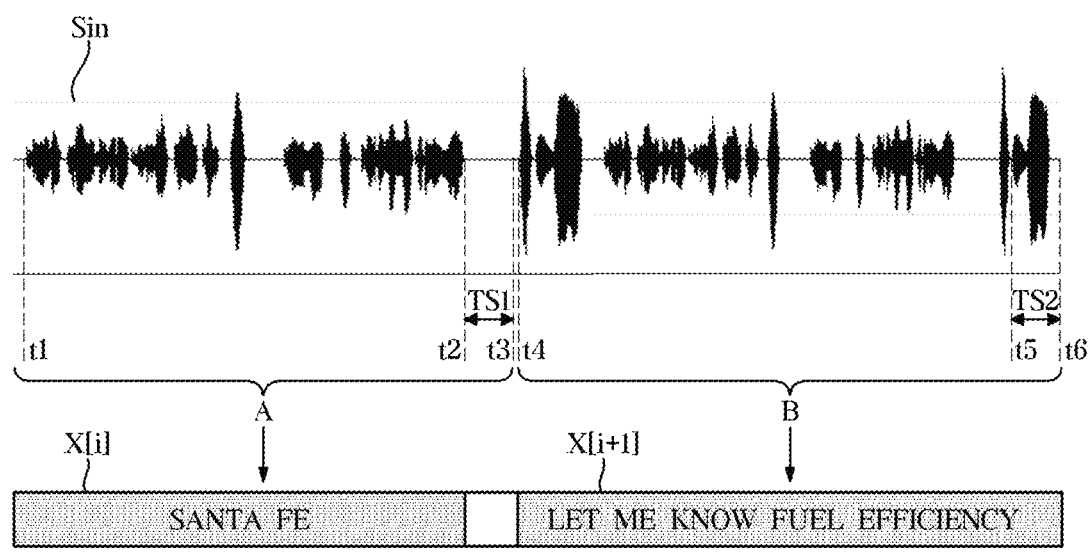
FIG. 2 is a diagram for describing an operation of a dialogue processing apparatus according to an embodiment.

FIG. 2 is a diagram for describing an operation of a dialogue processing apparatus according to an embodiment.

Referring to FIG. 2, according to the embodiment, the dialogue processing apparatus 100 may receive a speech signal Sin that includes the utterance: "Santa Fe . . . Let me know the fuel efficiency". In this case, it is assumed that the user stops the utterance for a short time after "Santa Fe", and then utters "let me know the fuel efficiency".

The input processor 131 may determine a time point t1 at which the user utters a predetermined call word or inputs a speech recognition start command as an utterance start time point. The input processor 131 may further store a speech signal input after the utterance start time point in the first buffer 151.

The input processor 131 may detect an utterance end time point on the basis of the speech signal stored in the first buffer 151.

In detail, when a silent section TS1 corresponding from a time point t2 at which the user stops inputting the speech to a time point t3 at which a predetermined time has elapsed after the time point t2 exists in the stored speech signal, the input processor 131 may determine the time point at which the silent section TS1 ends as an utterance end time point.

When the utterance end time point is detected, the input processor 131 may recognize a speech signal input in a section before the utterance end time point (hereinafter, referred to as a first section A). The input processor 131 may generate an utterance text X[i]: "Santa Fe" as a speech recognition result corresponding to the speech signal.

At this time, the input processor 131 may initialize the first buffer 151 by deleting the speech signal of the first section A stored in the first buffer 151. In addition, the input processor 131 may store a speech signal input after the utterance end time point of the first section A in the first buffer 151.

In addition, the input processor 131 may generate a speech recognition result corresponding to the speech signal after the utterance end time point on the basis of whether the intention of the user is identifiable according to the speech recognition result corresponding to the speech signal input in the first section A.

In detail, when the intention of the user is not identifiable using only the speech signal input in the first section A, the input processor 131 may generate a speech recognition result corresponding to a speech signal input in a section after the utterance end time point (hereinafter, referred to as a second section B).

In this case, the input processor 131 may store the speech recognition result of the first section A in the second buffer 152.

Thereafter, when an utterance end time point for the second section B is detected by the existence of another silent section TS2, the input processor 131 may recognize the speech signal input in the second section B that is stored in the first buffer 151. The input processor 131 may generate an utterance text X[i+1]: "let me know the fuel efficiency" as a speech recognition result corresponding to the speech signal.

At this time, the input processor 131 may initialize the first buffer 151 by deleting the speech signal of the second section B stored in the first buffer 151. In this case, the input processor 131 may store a speech signal input after the utterance end time point of the second section B in the first buffer 151.

In addition, the input processor 131 may generate a speech recognition result corresponding to a speech signal after the utterance end time point based on whether the intention of the user is identifiable on the basis of at least one of the speech recognition result of the first section A or the speech recognition result of the second section B.

In this case, when the user's intention is not identifiable only using the utterance text X[i+1]: "let me know the fuel efficiency" which is the speech recognition result corresponding to the second section B, the input processor 131 may combine the utterance text X[i]: "Santa Fe", which is the speech recognition result of the first section A, with the utterance text :"X[i+1]: "let me know the fuel economy", which is the speech recognition result of the second section B. The input processor 131 may further identify the intention of the user on the basis of the combined speech recognition results.

When the intention of the user is not identifiable even with combination of the speech recognition result of the first section A and the speech recognition result of the second section B, the input processor 131 may generate a speech recognition result corresponding to a speech signal input in a section after the utterance end time point of the second section B. Thereafter, the above described subsequent operations may be repeated.

On the other hand, when the intention of the user is identifiable on the basis of a speech recognition result of at least one section, the input processor 131 may transmit the determined user's intention to the dialogue manager 132. The dialogue manager 132 may determine an action corresponding to the user's intention. The result processor 133 may generate a dialogue response for performing the action received from the dialogue manager 132. The response by the result processor 133 may be output through the output device 140.

In addition, when the intention of the user is identifiable on the basis of a speech recognition result of at least one section, the input processor 131 may block the input speech signal by switching the speech input device 110 into a closed state. In addition, the input processor 131 may initialize at least one of the first buffer 151 or the second buffer 152 by deleting data stored in the at least one of the first buffer 151 or the second buffer 152.

The input processor 131 may perform a processing operation on the speech signal after the utterance end time point according to whether the user's intention is identifiable. The input processor 131 may use not only the speech recognition result after the utterance end time point but also the speech recognition result before the utterance end time point as a basis for controlling the operation of identifying the user's intention. Accordingly, the intention of the user is accurately identified, a response suitable for the user is output, and the convenience of the user is increased.

Figure 3:
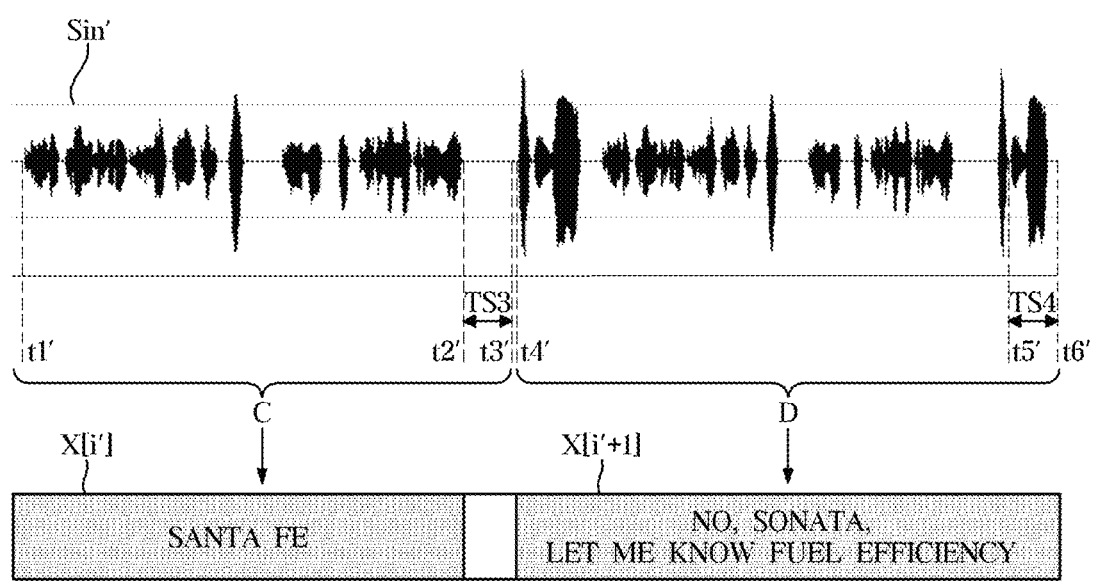
FIG. 3 is a diagram for describing an operation of a dialogue processing apparatus, according to an embodiment.

FIG. 3 is a diagram for describing an operation of a dialogue processing apparatus according to another embodiment.

Referring to FIG. 3, according to another embodiment, a dialogue processing apparatus 100 may receive a speech signal Sin that includes the utterance: "Santa Fe . . . No, Sonata, let me know the fuel efficiency". In this case, it is assumed that the user stops the utterance for a short time after "Santa Fe", and then utters "No, Sonata, let me know the fuel efficiency".

As described above with reference to FIG. 2, the input processor 131 may determine a time point t1' at which the user utters a predetermined call word or inputs a speech recognition start command as an utterance start time point. The input processor 131 may store a speech signal input after the utterance start time point in the first buffer 151.

The input processor 131 may detect an utterance end time point on the basis of the speech signal stored in the first buffer 151. In detail, when a silent section TS3 from a time point t2' at which the user stops inputting the speech to a time point t3' at which a predetermined time has elapsed after the time point t2' exists in the stored speech signal, the input processor 131 may determine the time point at which the silent section TS3 ends as the utterance end time point.

When the utterance end time point is detected, the input processor 131 may recognize a speech signal input in a section before the utterance end time point (hereinafter, referred to as a first section C). The input processor 131 may generate an utterance text X[i']: "Santa Fe" as a speech recognition result corresponding to the speech signal.

At this time, the input processor 131 may initialize the first buffer 151 by deleting the speech signal of the first section C stored in the first buffer 151. In addition, the input processor 131 may store a speech signal input after the utterance end time point of the first section C in the first buffer 151.

In addition, the input processor 131 may generate a speech recognition result corresponding to the speech signal after the utterance end time point on the basis of whether the intention of the user is identifiable according to the speech recognition result corresponding to the speech signal input in the first section C.

In detail, when the intention of the user is not identifiable using only the speech signal input in the first section C, the input processor 131 may generate a speech recognition result corresponding to a speech signal input in a section after the utterance end time point (hereinafter, referred to as a second section D).

In this case, the input processor 131 may store the speech recognition result of the first section C in the second buffer 152.

Thereafter, when an utterance end time point for the second section D is detected by the existence of another silent section TS4, the input processor 131 may recognize the speech signal input in the second section D that is stored in the first buffer 151. The input processor 131 may generate an utterance text X[i'+1]: "No, Sonata, let me know the fuel efficiency" as a speech recognition result corresponding to the speech signal.

At this time, the input processor 131 may initialize the first buffer 151 by deleting the speech signal of the second section D stored in the first buffer 151. In addition, the input processor 131 may store a speech signal input after the utterance end time point of the second section D in the first buffer 151.

In addition, the input processor 131 may generate a speech recognition result corresponding to a speech signal after the utterance end time point on the basis of whether the intention of the user is identifiable, on the basis of at least one of the speech recognition result of the first section C or the speech recognition result of the second section D.

In this case, when the user's intention is identifiable only using the utterance text X[i'+1]: "No, Sonata, let me know the fuel efficiency" which is a speech recognition result corresponding to the second section D, the input processor 131 may transmit the user's intention to the dialogue manager 132. Upon the user's intention transmitted to the result processor 133 via the dialogue manager 132, the result processor 133 generates a dialog response.

Alternatively, the input processor 131 may determine an intention candidate group for determining the user's intention based on at least one of the utterance text X[i'+1]: "No, Sonata, let me know the fuel efficiency", which is a speech recognition result of the second period D, or the utterance text X[i']: "Santa Fe", which is a speech recognition result of the first period C. The input processor 131 may determine one selected from the intention candidate group as the user's intention.

In detail, the input processor 131 may determine an accuracy with respect to the intention candidate group and may determine an intention candidate in the intention candidate group that has the highest accuracy as the user's intention. In this case, the accuracy on the intention candidate group may be calculated as a probability value. The input processor 131 may determine an intention candidate having the highest probability value as the user's intention.

For example, the input processor 131 may determine a first intention candidate on the basis of the utterance text X[i'+1]: "No, Sonata, let me know the fuel efficiency", which is the speech recognition result of the second section D. In addition, the input processor 131 may determine a second intention candidate on the basis of a result value of combining the speech recognition results of the first and second sections C and D: "Santa Fe, No, Sonata, let me know the fuel efficiency". The input processor 131 may determine an intention candidate having the highest accuracy between the first intention candidate and the second intention candidate as the user's intention.

Thereafter, the input processor 131 may transmit the determined user's intention to the dialogue manager 132. Upon the user's intention transmitted to the result processor 133 via the dialogue manager 132, the result processor 133 may generate a dialog response.

In addition, when the user's intention is determined, the input processor 131 may block the input speech signal by switching the speech input device 110 into a closed state. In addition, the input processor 131 may initialize at least one of the first buffer 151 or the second buffer 152 by deleting data stored in the at least one of the first buffer 151 or the second buffer 152.

The input processor 131 may determine a user's intention candidate group by combining speech recognition results of at least one speech recognition section divided based on an utterance end time point. The input processor 131 may further determine the user's final intention on the basis of the accuracy on the intention candidate group. Accordingly, the intention of the user is accurately identified, a response suitable for the user is output, and the convenience of the user is increased.

Figure 4:
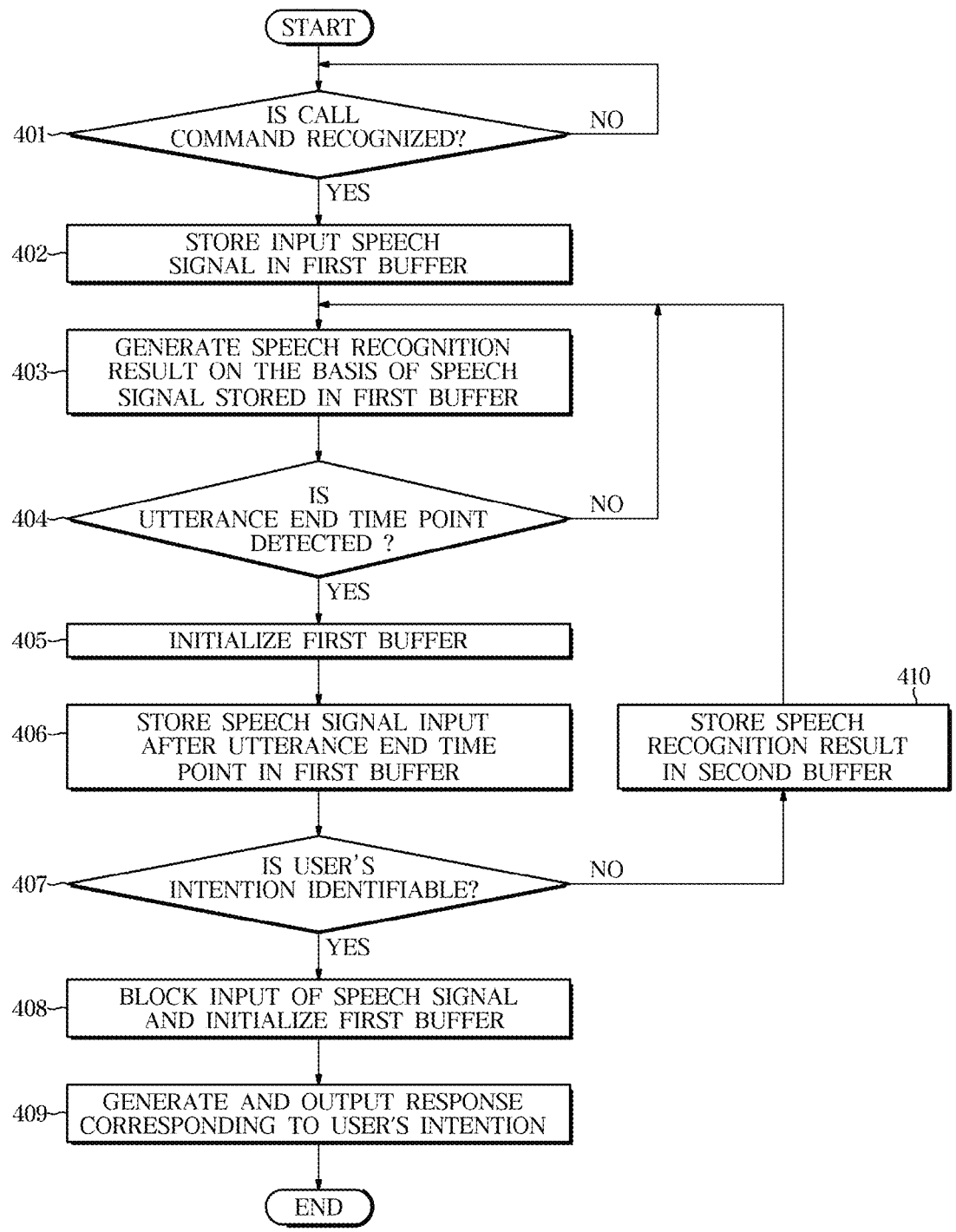
FIG. 4 is a flowchart showing a dialogue processing method according to an embodiment.

FIG. 4 is a flowchart showing a dialogue processing method according to an embodiment.

Referring to FIG. 4, the dialogue processing apparatus 100 may identify whether a call command is recognized (401). In this case, the call command may be set as a predetermined call word, and the user may issue a call command by uttering a predetermined call word or inputting a speech recognition start command, for example, through manipulation of a button.

When the call command is recognized (YES in operation 401), the dialogue processing apparatus 100 may store an input speech signal in the first buffer 151 (402). In this case, the dialogue processing apparatus 100 may store the input speech signals in real time in the first buffer 151.

The dialogue processing apparatus 100 may generate a speech recognition result on the basis of the speech signal stored in the first buffer (403).

The dialogue processing apparatus 100 may identify whether an utterance end time point is detected (404). In detail, when a silent section corresponding from a time point at which the user stops inputting the speech to a time point at which a predetermined time has elapsed exists in the stored speech signal, the dialogue processing apparatus 100 may determine the time point at which the silent section ends as an utterance end time point.

When the utterance end time point is detected (YES in operation 404), the dialogue processing apparatus 100 may initialize the first buffer 151 by deleting the speech signal (a speech signal input in a $n^{th}$ speech recognition section) stored in the first buffer 151 (405). The dialogue processing apparatus 100 may store a speech signal input after the utterance end time point (a speech signal input in a $n+1^{th}$ speech recognition section) in the first buffer 151 (406).

Thereafter, the dialogue processing apparatus 100 may identify whether the intention of the user is identifiable using the speech recognition result generated on the basis of the speech signal before the utterance end time point (407). In this case, the speech recognition result may represent the speech recognition result generated in operation 403, i.e., the speech recognition result corresponding to the speech signal input in the $n^{th}$ speech recognition section.

When the intention of the user is not identifiable (NO in operation 407), the dialogue processing apparatus 100 may store the generated speech recognition result in the second buffer 152 (410). In other words, the dialogue processing apparatus 100 may store the speech recognition result (the speech recognition result that corresponds to the speech signal input in the $n^{th}$ speech recognition section) generated in operation 403 in the second buffer 152. Thereafter, the dialogue processing apparatus 100 may generate a speech recognition result on the basis of the speech signal (the speech signal input in the $n+1^{th}$ speech recognition section) stored in the first buffer 151 (403). In this case, the speech signal stored in the first buffer 151 may represent the speech signal input after the utterance end time point (i.e., the speech signal input in the $n+1^{th}$ speech recognition section).

Thereafter, the dialogue processing apparatus 100 may identify whether an utterance end time point of the $n+1^{th}$ speech recognition section is detected (404). When the utterance end time point is detected (YES in operation 404), the dialogue processing apparatus 100 may perform operations 405 and 406 as described above. Thereafter, the dialogue processing apparatus 100 may check whether the user's intention is identifiable on the basis of at least one of the speech recognition result of the $n+1^{th}$ speech recognition section or the speech recognition result of the $n^{th}$ speech recognition section stored in the second buffer 152 (407). Thereafter, the above described subsequent processes may be repeated.

As another example, when the intention of the user is identifiable (407), the dialogue processing apparatus 100 may block the input speech signal and initialize the first buffer 151 (408). In detail, the dialogue processing apparatus 100 may block the input speech signal by switching the speech input device 110 into a closed state and may initialize the first buffer 151 by deleting data stored in the first buffer 151. In this case, the dialogue processing apparatus 100 may initialize the second buffer 152 by deleting data stored in the second buffer 152.

The dialogue processing apparatus 100 may generate and output a response corresponding to the users intention (409).

The input processor 131 may perform a processing operation on the speech signal after utterance end time point according to whether the user's intention is identifiable. The input processor 131 may use not only the speech recognition result after the utterance end time point but also the speech recognition result before the utterance end time point as a basis for controlling the operation of identifying the user's intention. Accordingly, the intention of the user is accurately identified, a response suitable for the user is output, and the convenience of the user is increased.

Referring to FIG. 4, operation 404 is performed after operation 403, but operation 403 and operation 404 may be performed at the same time, and operation 403 may also be performed after operation 404. However, the performing of operation 403 after operation 404 represents, when the utterance end time point is detected (YES in operation 404), performing operation 403 generating a speech recognition result on the basis of the speech signal stored in the first buffer 151.

Figure 5A:
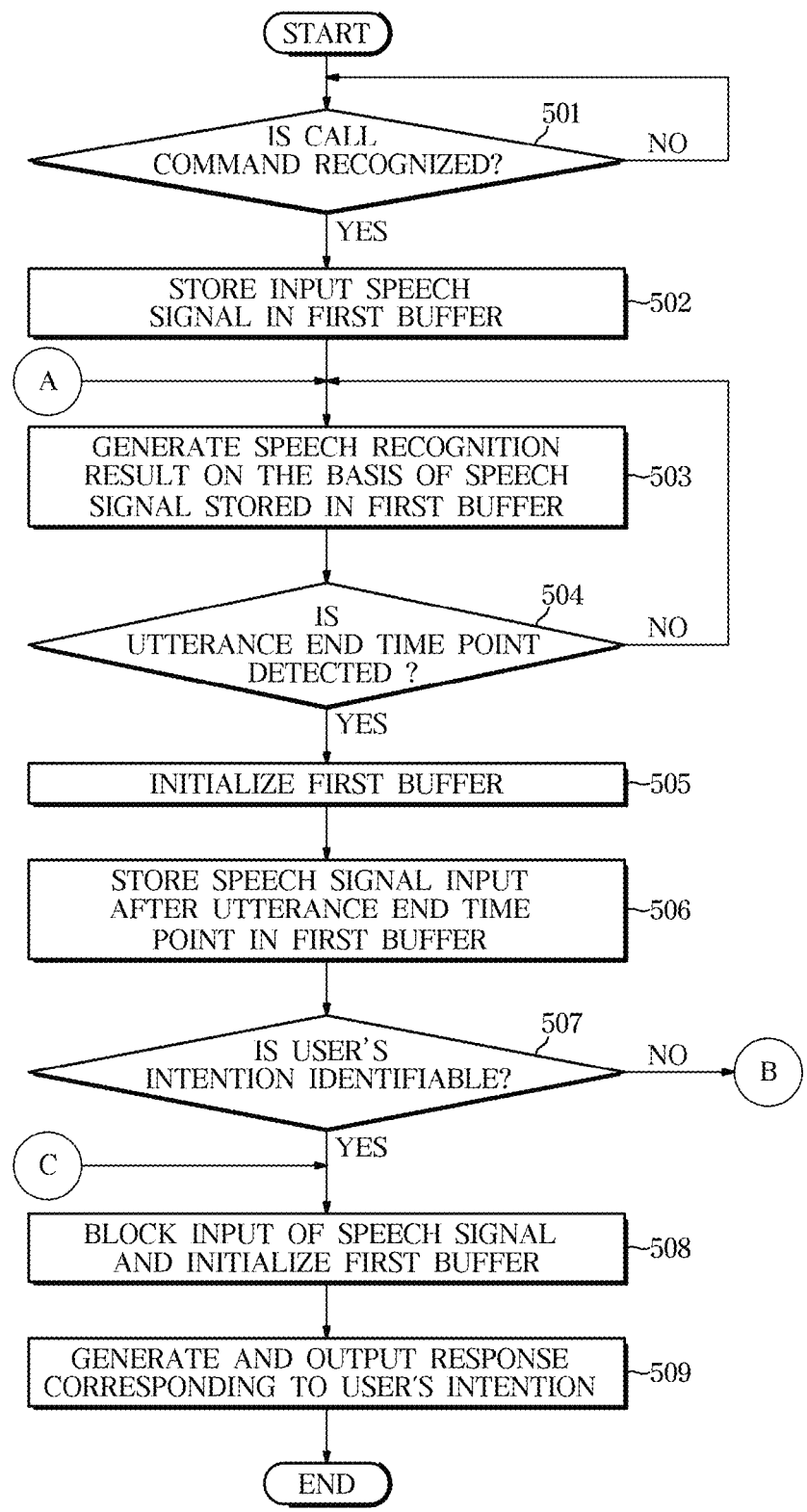
FIGS. 5A and 5B are a flowchart showing a dialogue processing method according to another embodiment.
Figure 5B:
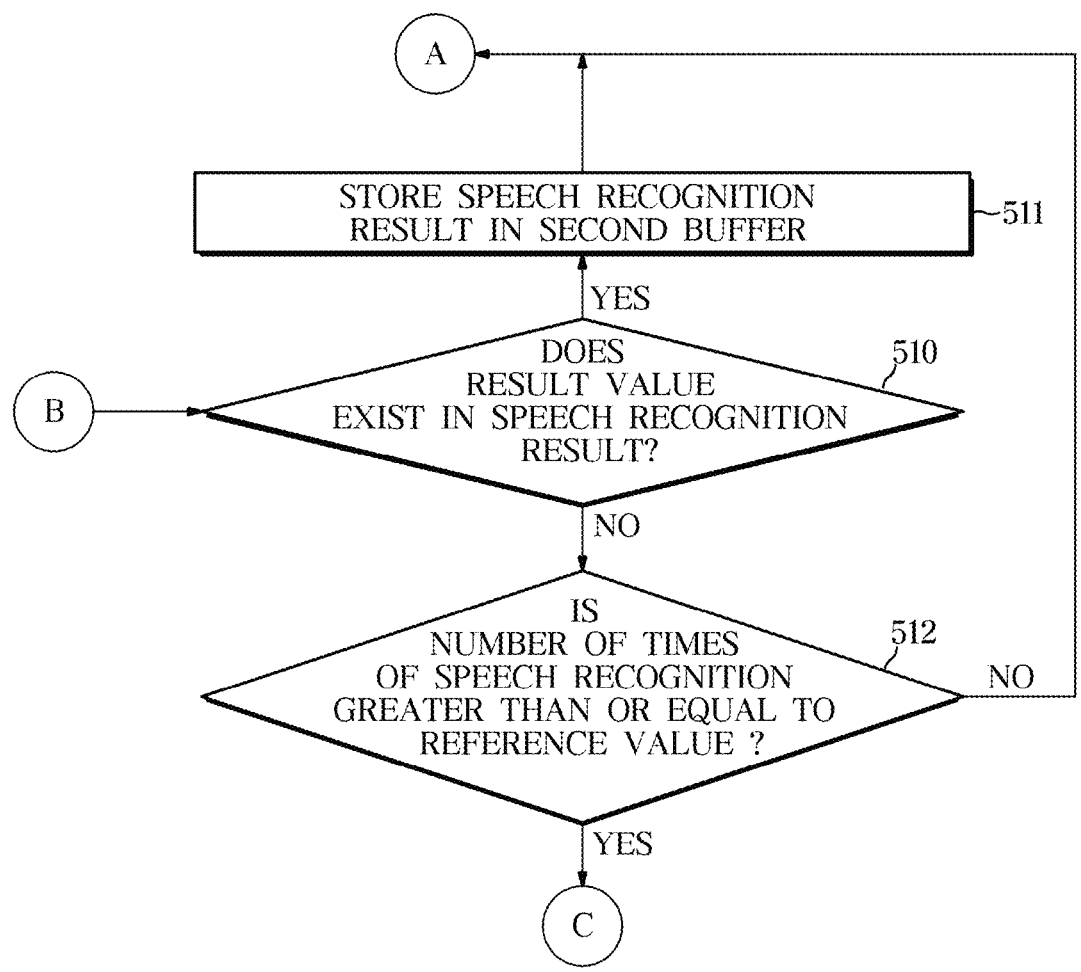

FIGS. 5A and 5B are a flowchart showing a dialogue processing method according to another embodiment.

Referring to FIGS. 5A and 5B, the dialogue processing apparatus 100 according to the embodiment may identify whether a call command is recognized (501). When the call command is recognized (YES in operation 501), the dialogue processing apparatus 100 may store an input speech signal in the first buffer 151 (502). In this case, the dialogue processing apparatus 100 may store the input speech signals in real time in the first buffer 151.

The dialogue processing apparatus 100 may generate a speech recognition result on the basis of the speech signal stored in the first buffer (503).

The dialogue processing apparatus 100 may identify whether an utterance end time point is detected (504).

When the utterance end time point is detected (YES in operation 504), the dialogue processing apparatus 100 may initialize the first buffer 151 by deleting the speech signal (a speech signal input in a $n^{th}$ speech recognition section) stored in the first buffer 151 (505). The dialogue processing apparatus 100 may store a speech signal input after the utterance end time point (a speech signal input in a n+1$^{th}$ speech recognition section) in the first buffer 151 (506).

Thereafter, the dialogue processing apparatus 100 may check whether the intention of the user is identifiable using the speech recognition result generated on the basis of the speech signal before the utterance end time point (507). In this case, the speech recognition result may represent the speech recognition result generated in operation 503, i.e., the speech recognition result corresponding to the speech signal input in the n$^{th}$ speech recognition section.

When the intention of the user is not identifiable (NO in operation 507), the dialogue processing apparatus 100 may identify whether a result value exists in the speech recognition result (510).

In this case, when an utterance text exists in the speech recognition result, the dialogue processing apparatus 100 may confirm that the result value exists. In other words, when no utterance text is generated in the speech recognition result, for example, because the user does not speak an utterance, the dialogue processing apparatus 100 may determine that no result value exists in the speech recognition result.

When the result value exists in the speech recognition result (YES in operation 510), the dialogue processing apparatus 100 may store the generated speech recognition result in the second buffer 152 (511). In other words, the dialogue processing apparatus 100 may store the speech recognition result (the speech recognition result corresponding to the speech signal input in the n$^{th}$ speech recognition section) generated in operation 503 in the second buffer 152. Thereafter, the dialogue processing apparatus 100 may generate a speech recognition result on the basis of the speech signal (the speech signal input in the n+1$^{th}$ speech recognition section) stored in the first buffer 151 (503). In this case, the speech signal stored in the first buffer 151 may represent a speech signal input after the utterance end time point (i.e., a speech signal input in the n+1$^{th}$ speech recognition section).

Thereafter, the dialogue processing apparatus 100 may identify whether an utterance end time point of the n+1$^{th}$ speech recognition section is detected (504). When the utterance end time point is detected (YES in operation 504), the dialogue processing apparatus 100 may perform operations 505 and 506 as described above. Thereafter, the dialogue processing apparatus 100 may check whether the user's intention is identifiable on the basis of at least one of the speech recognition result of the n+1$^{th}$ speech recognition section or the speech recognition result of the n$^{th}$ speech recognition section stored in the second buffer 152 (507). Thereafter, the above described subsequent processes may be repeated.

In another example, when a result value does not exist in the speech recognition result (NO in operation 510), the dialogue processing apparatus 100 may determine whether the number of times of the speech recognition is greater than or equal to a reference value (512). In this case, the number of times of the speech recognition may represent the number of times that a speech recognition result is generated. In addition, the reference value for the number of times of the speech recognition may represent a maximum number of times of the speech recognition obtained in consideration of the storage capacity of the storage 150.

When the number of times of the speech recognition is less than the reference value (NO in operation 512), the dialogue processing apparatus 100 may generate a speech recognition result on the basis of the speech signal stored in the first buffer 151 (503). In this case, the speech signal stored in the first buffer 151 may represent a speech signal input after the utterance end time point (i.e., a speech signal input in the n+1$^{th}$ speech recognition section). Thereafter, the above described subsequent processes may be repeated.

In another example, when the number of times of the speech recognition is equal to or greater than the reference value (YES in operation 512) or when the intention of the user is identifiable (YES in operation 507), the dialogue processing apparatus 100 may block the input of the speech signal and initialize the first buffer 151 (508). In detail, the dialogue processing apparatus 100 may block the input speech signal by switching the speech input device 110 into a closed state and may initialize the first buffer 151 by deleting data stored in the first buffer 151. In this case, the dialogue processing apparatus 100 may initialize the second buffer 152 by deleting data stored in the second buffer 152.

The dialogue processing apparatus 100 may generate and output a response corresponding to the users intention (509). In this case, the dialogue processing apparatus 100 may set the number of times of the speech recognition to an initial value. When a call command is recognized after the number of times of the speech recognition is set to the initial value, the dialogue processing apparatus 100 may generate a speech recognition result corresponding to a first speech recognition section.

The input processor 131 may perform a processing operation on the speech signal after the utterance end time point according to whether the user's intention is identifiable. The input processor 131 may use not only the speech recognition result after the utterance end time point but also the speech recognition result before the utterance end time point as a basis for controlling the operation of identifying the user's intention. Accordingly, the intention of the user is accurately identified, a response suitable for the user is output, and the convenience of the user is increased.

In addition, since the speech recognition result for the speech input by the user is generated according to the number of times of the speech recognition, efficient speech recognition in consideration of the storage capacity may be performed.

Referring to FIG. 5A, operation 504 is performed after operation 503, but operation 503 and operation 504 may be performed at the same time, and operation 503 may also be performed after operation 504. However, the performing of operation 503 after operation 504 represents, when the utterance end time point is detected (YES in operation 504), performing operation 503 generating a speech recognition result on the basis of the speech signal stored in the first buffer 151.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the dialogue processing apparatus, the vehicle including the same, and the dialogue processing method thereof can improve the accuracy in recognizing a user's speech and processing a dialogue. As the user's intention is accurately identified, the convenience of user can be improved.

Although the embodiments of the present disclosure have been described for illustrative purposes, those of ordinary skill in the art should appreciate that various modifications, additions and substitutions are possible, without departing from the scope and spirit of the disclosure. Therefore, the embodiments of the present disclosure have not been described for limiting purposes.

What is claimed is:

1. A dialogue processing apparatus comprising:
    a speech input device configured to receive a speech signal of a user;
    a first buffer configured to store the received speech signal therein;
    an output device; and
    a controller configured to detect an utterance end time point on the basis of the stored speech signal, generate a second speech recognition result corresponding to a speech signal after the utterance end time point on the basis of whether an intention of the user is to be identified from a first speech recognition result corresponding to a speech signal before the utterance end time point, and control the output device to output a response corresponding to the intention of the user determined on the basis of a combination of the first speech recognition result and the second speech recognition result.

2. The dialogue processing apparatus of claim 1, wherein the second speech recognition result corresponding to the speech signal after the utterance end time point is generated when the intention of the user is not identifiable from the first speech recognition result.

3. The dialogue processing apparatus of claim 2, further comprising a second buffer,
    wherein the controller stores the first speech recognition result in the second buffer when the intention of the user is not identifiable from the first speech recognition result.

4. The dialogue processing apparatus of claim 2, wherein the controller generates the second speech recognition result on the basis of a number of times of the speech recognition when the intention of the user is not identifiable from the first speech recognition result.

5. The dialogue processing apparatus of claim 4, wherein the controller generates the second speech recognition result on the basis of the speech signal after the utterance end time point when the number of times of the speech recognition is less than a predetermined reference value.

6. The dialogue processing apparatus of claim 4, wherein the controller deletes data stored in the first buffer when the number of times of the speech recognition is greater than or equal to a predetermined reference value, and generates a response corresponding to a case in which the intention of the user is not identifiable.

7. The dialogue processing apparatus of claim 1, wherein the controller sets the number of times of the speech recognition to an initial value when a response corresponding to the speech signal of the user is output.

8. The dialogue processing apparatus of claim 1, wherein when the second speech recognition result is generated, the controller determines an intention candidate group for determining the intention of the user on the basis of at least one of the first speech recognition result or the second speech recognition result, and determines one selected from the determined intention candidate group to be the intention of the user.

9. The dialogue processing apparatus of claim 8, wherein the controller determines an accuracy on the intention candidate group and determines an intention candidate in the intention candidate group that has a highest accuracy to be the intention of the user.

10. The dialogue processing apparatus of claim 1, wherein when the utterance end time point is detected, the controller is configured to delete data stored in the first buffer and stores a speech signal input after the utterance end time point in the first buffer.

11. The dialogue processing apparatus of claim 1, wherein when the intention of the user is identifiable from the first speech recognition result, the controller deletes data stored in the first buffer.

12. A vehicle comprising:
    a speech input device configured to receive a speech signal of a user;
    a first buffer configured to store the received speech signal therein;
    an output device; and
    a controller configured to detect an utterance end time point on the basis of the stored speech signal, generate a second speech recognition result corresponding to a speech signal after the utterance end time point on the basis of whether an intention of the user is to be identified from a first speech recognition result corresponding to a speech signal before the utterance end time point, and control the output device to output a response corresponding to the intention of the user determined on the basis of a combination of the first speech recognition result and the second speech recognition result.

13. The vehicle of claim 12, wherein the controller generates the second speech recognition result corresponding to the speech signal after the utterance end time point when the intention of the user is not identifiable from the first speech recognition result.

14. The vehicle of claim 12, wherein when the second speech recognition result is generated, the controller determines an intention candidate group for determining the intention of the user on the basis of at least one of the first speech recognition result or the second speech recognition result, and determines one selected from the determined intention candidate group to be the intention of the user.

15. A dialogue processing method comprising:
    receiving a speech signal of a user;
    storing the received speech signal in a first buffer;
    detecting an utterance end time point on the basis of the stored speech signal;
    generating a second speech recognition result corresponding to a speech signal after the utterance end time point on the basis of whether an intention of the user is to be identified from a first speech recognition result corresponding to a speech signal before the utterance end time point; and
    outputting a response corresponding to the intention of the user determined on the basis of a combination of the first speech recognition result and the second speech recognition result.

16. The dialogue processing method of claim 15, wherein the generating of a second speech recognition result corresponding to a speech signal after the utterance end time point includes generating the second speech recognition result corresponding to the speech signal after the utterance end time point is generated when the intention of the user is not identifiable from the first speech recognition result.

17. The dialogue processing method of claim 16, wherein the generating of a second speech recognition result corresponding to a speech signal after the utterance end time point includes storing the first speech recognition result in a second buffer when the intention of the user is not identifiable from the first speech recognition result.

18. The dialogue processing method of claim 16, wherein the generating of a second speech recognition result corresponding to a speech signal after the utterance end time point includes generating the second speech recognition result on the basis of a number of times of the speech recognition when the intention of the user is not identifiable from the first speech recognition result.

19. The dialogue processing method of claim 18, wherein the generating of a second speech recognition result corresponding to a speech signal after the utterance end time point includes generating the second speech recognition result on the basis of the speech signal after the utterance end time point when the number of times of the speech recognition is less than a predetermined reference value.

20. The dialogue processing method of claim 15, further comprising: when the second speech recognition result is generated, determining an intention candidate group for determining the intention of the user on the basis of at least one of the first speech recognition result or the second speech recognition result, and determining one selected from the determined intention candidate group to be the intention of the user.

* * * * *